United States Patent [19]

Willkens et al.

[11] Patent Number: 4,970,057

[45] Date of Patent: Nov. 13, 1990

[54] SILICON NITRIDE VACUUM FURNACE PROCESS

[75] Inventors: Craig A. Willkens, Sterling; Stephen D. Hartline, Millbury; Normand P. Arsenault, Holden, all of Mass.

[73] Assignee: Norton Company, Worcester, Mass.

[21] Appl. No.: 479,773

[22] Filed: Feb. 14, 1990

Related U.S. Application Data

[63] Continuation-in-part of Ser. No. 345,326, Apr. 28, 1989, abandoned.

[51] Int. Cl.$^5$ .......................................... C01B 21/068
[52] U.S. Cl. .................................................. 423/344
[58] Field of Search ........................................ 423/344

Primary Examiner—Gary P. Straub
Assistant Examiner—Lori F. Cuomo
Attorney, Agent, or Firm—Volker Ulbrich

[57] ABSTRACT

An improved process of preparing silicon nitride by the direct nitridation of silicon metal is disclosed. The process is a multi-step one which is substantially more efficient than prior processes and produces a silicon nitride having an oxygen content of less than 1%, a silicon metal content of less than 0.5%, and an alpha phase content of at least 85%, preferably at least 90%. The silicon nitride may be converted to a powder.

27 Claims, 1 Drawing Sheet

Figure 1 - Temperature/Pressure Profile for Example 1

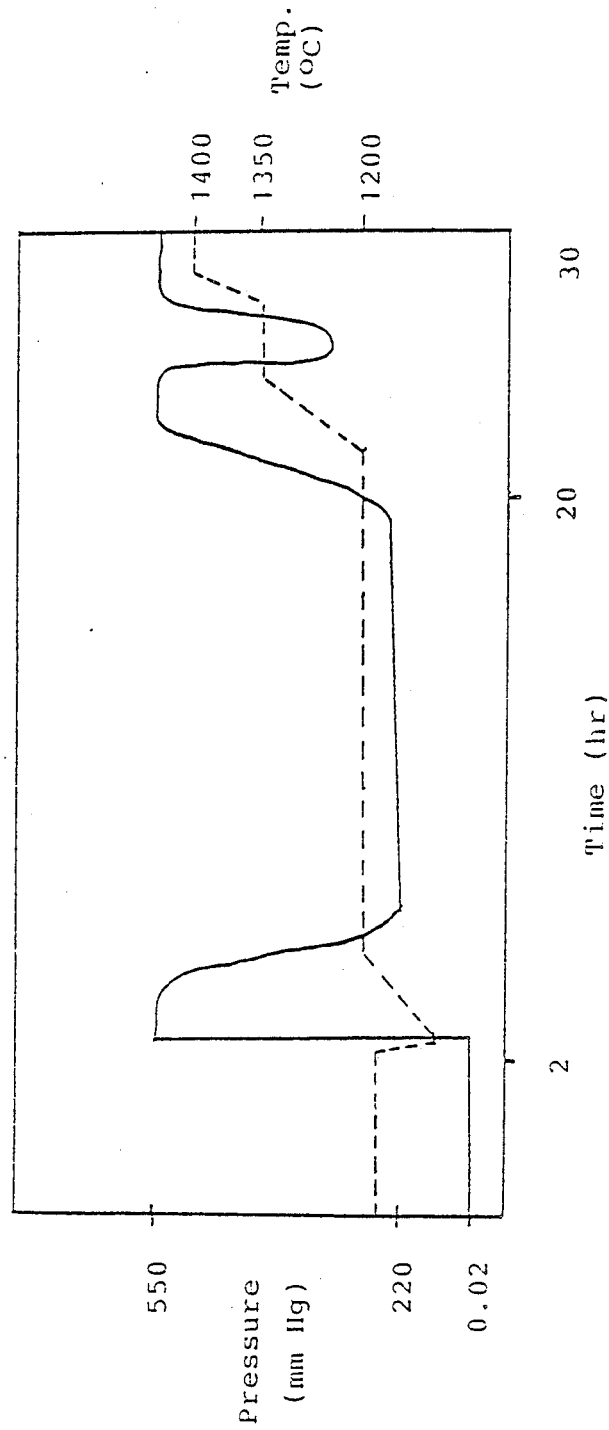
Figure 1 -- Temperature/Pressure Profile for Example 1

SILICON NITRIDE VACUUM FURNACE PROCESS

CROSS REFERENCE TO RELATED APPLICATION

This application is a continuation-in-part of U.S.S.N. 345,326, filed Apr. 28, 1989, now abandoned.

TECHNICAL FIELD

This invention relates to an improved process for preparing silicon nitride of high alpha content, i.e. above 85%, by the direct nitridation of silicon metal.

BACKGROUND AND INFORMATION DISCLOSURE STATEMENT

The following publications are representative of the most relevant prior art known to Applicants at the time of filing of the Application.

| UNITED STATES PATENTS | | |
|---|---|---|
| 3,937,792 | February 10, 1976 | R. J. Lumby |
| 4,127,630 | November 28, 1978 | M. E. Washburn |
| 4,869,943 | September 26, 1989 | N. D. Corbin et al. |

OTHER PUBLICATIONS

J. A. Mangels, "Effect of Rate-Controlled Nitriding and Nitriding Atmospheres on the Formation of Reaction-Bonded $Si_3N_4$," Ceramic Bulletin, Vol. 60, No. 6 (1981) p 613

R. M. Williams et al., "Slip Casting of Silicon Shapes and Their Nitriding," Ceramic Bulletin, Vol. 62, No. 5 (1983) p 607

A. J. Molson, et al., "Removal of Surface Silica and its Effect Upon Silicon Nitridation Kinetics," J.Mat.-Sci., Vol. 16, (1981) p 2319.

Silicon nitride has been known for many years. However, the interest in this material has increased substantially in recent years due to its excellent strength properties at both room and elevated temperatures as well as its electrical insulating properties. As such, considerable interest has been generated in devising improved processes for its preparation which processes more efficiently and economically prepare alpha silicon nitride which can be used to prepare final silicon nitride bodies having all desired shapes and cross-sectional areas.

There are several techniques utilized for the commercial manufacture/synthesis of silicon nitride. The most common of these entails the nitridation of silicon metal powder. Most manufacturers using this technique use either a flowing atmosphere or a quasi-static atmosphere at a slight positive pressure. Temperature and gas flow are controlled by maintaining the chamber pressure between two fixed limits at a slight positive pressure. As a result of the significant exotherm accompanying the nitridation of silicon powder these processes have generally produced only about 1.5 kilograms of silicon nitride powder per cubic foot of furnace volume. The exotherm balance has been found to be very sensitive to many factors which has necessitated the slow reaction rates and heating rates, thereby leading to extremely low utilization rate of the furnace, resulting in extremely long total process times to produce a substantial quantity of silicon nitride.

U.S. Pat. No. 3,937,792 discloses a process which utilizes an exotherm control for the synthesis of silicon nitride powder. In the process, alpha silicon nitride seed powder is mixed into silicon powder and the seeded mixture is subjected to nitridation at atmospheric pressure. The exotherm control is provided by means of an argon quench when the temperature in the silicon powder bed exceeds a predetermined limit. The process has been found to be difficult to control tightly to reproducibly prepare high alpha silicon nitride powder.

U.S. Pat. No. 4,869,943 discloses fiber reinforced silicon nitride ceramics which are prepared by reinforcing silicon powders with suitable fibers, debinderizing, and then nitriding in a so-called "rate limited" nitridation process designed to maximize the amount of alpha $Si_3N_4$. Prior to nitriding "the debinderized composite samples are initially heated in vacuo to a temperature of about 1100° C." Thereafter, the process entails backfilling the furnace with nitrogen to a subatmospheric pressure and then increasing the temperature at about 100° C. per hr. As the temperature increases, nitriding proceeds at a faster rate and begins to cause the pressure in the furnace to fall as the nitrogen is converted to nonvolatile silicon nitride. When the consumption of nitrogen is rapid, the temperature increase rate is greatly reduced, so that substantially complete reaction normally requires 30–48 hours. The process does not produce silicon nitrides of high alpha content.

The low pressure nitridation process has also been utilized by Norton Company for preparing reaction bonded silicon nitride (RBSN) monoliths and composites. The process allowed for relatively fast reaction rates which resulted in total cycle times of only 24 to 48 hours to produce the RBSN. The bodies being nitrided had densities ranging from about 1 to 1.7 g/cc and contained only silicon powder and optional reinforcing fibers. Prior to commencing the nitriding reaction, the silicon powder materials were heated in a vacuum at 600–800° C. for 20 hours to insure complete degassing. The RBSN monoliths and composites produced had an alpha content of only 40–50% which is far too low for most silicon nitride applications.

U.S. Pat. No. 4,127,630 teaches the fabrication of a reaction bonded silicon nitride (RBSN) product by first forming a silicon billet, then sintering the billet in an inert atmosphere such as argon, then machining the sintered billet to the desired shape, and then nitriding the shaped silicon piece in a conventional nitriding furnace over an extended heating cycle of 63 hours.

Mangels teaches a reaction-rate controlled process for nitriding pre-formed silicon metal powder shapes, i.e. forming an RBSN. The process entails subjecting a green silicon shape to heat and a quasistatic atmosphere containing nitrogen at a pressure of about 914 mm Hg. The exotherm of the silicon-nitrogen reaction is controlled by starting the process with a nitriding gas pressure of 914 mm Hg, and when the pressure drops more nitriding gas is introduced into the furnace to return the pressure to the 914 mm Hg. The nitriding gas is a mixture of nitrogen/hydrogen, nitrogen/helium, nitrogen/-hydrogen/helium, or nitrogen/hydrogen/argon. The conclusion reached by the article is that the "nitriding atmosphere should be dynamic with respect to nitrogen partial pressure. That is, the nitrogen pressure should be high at the start of the nitriding reaction and decrease as the reaction proceeds." The process does not produce silicon nitride powders of high alpha content.

Williams et al. is a continuation of the Mangels work and discloses forming RBSN by backfilling a reactor with a gas mixture containing 4% hydrogen, 25% helium, and 71% nitrogen, and thereafter adding pure nitrogen, thus maintaining a constant partial pressure of nitrogen. The process does not produce silicon nitride powders of high alpha content.

Molson et al. teaches that removal of a thin (about 3 nanometer) native oxide layer covering the silicon surface can lead to accelerated nitriding kinetics. None of their treatments entailed the use of vacuum. Rather they used hydrogen or argon treatments to remove the oxide layer.

European Application No. 0 186 497 (Onoda Cement) discloses a process for producing $Si_3N_4$ of high alpha content which entails using nitrogen pressure control of the reaction which is performed under a reduced pressure by continuously charging an approximately constant quantity of nitrogen gas so as to maintain the nitrogen partial pressure at a predetermined reduced pressure, which must be no higher than 0.5 atmospheres until half of the silicon metal has been nitrided. Thus the reaction is performed at a constant sub-atmospheric pressure. The process is capable of being used only with thin (0.5–1 cm) beds of silicon powder to form high alpha $Si_3N_4$ powder.

SUMMARY OF THE INVENTION

Since all of the above-mentioned conventional processes have failed to consistently and reproducibly produce silicon nitride, preferably in the form of a powder, having an alpha content of at least 85%, preferably at least 90%, free silicon of less than 0.2%, and at a total cycle rate of at least 5 kilograms of silicon nitride produced per cubic foot of furnace per hour, it is an object of the present invention to do so.

It is a further object of the invention to produce silicon nitride having an alpha content of at least 85% which has an oxygen content below about 1%.

It is a further object of the invention to produce silicon nitride from thick, i.e. greater than 1 inch, silicon powder beds.

It is a further object of the invention to produce silicon nitride having less than about 100 ppm iron by starting with silicon metal powders containing less than 100 ppm iron.

It is a further object of the invention to develop an improved silicon metal nitridation process which will consistently yield silicon nitride having an alpha content in excess of 85%, preferably in excess of 90%.

Broadly the present nitridation process involves (i) forming a bed of silicon metal powder which contains at least about 5% alpha silicon nitride seed, (ii) placing the bed into a vacuum furnace, (iii) deoxidizing the bed at a temperature of at least 1150° C., (iv) reducing the temperature to below that at which nitridation occurs and backfilling the furnace to a subatmospheric pressure with a gas mixture comprising about 30 to 85% nitrogen and about 70 to 15% of a combination of hydrogen and helium, (v) increasing the temperature to commence the nitridation, (vi) allowing the pressure in the furnace to fall about 5 to 50 mm Hg before holding the temperature essentially constant, (vii) supplying nitrogen to the furnace at an essentially fixed flow rate of about 3 to 25% per hour based upon total theoretical nitrogen requirements for full conversion of the silicon to silicon nitride until the reaction rate is insufficient to utilize all of the continually added nitrogen and the pressure in the vacuum furnace reaches about the pressure of step (iv), (viii) terminating the addition of nitrogen and increasing the temperature about 50 to 150° C., (ix) repeating steps (vi)–(viii) until reaching a maximum temperature of about 1,400° C., (x) terminating the addition of nitrogen and allowing the bed to soak in nitrogen for at least about 2 hours, and (xi) cooling the reactor to room temperature.

BRIEF DESCRIPTION OF THE DRAWING

FIG. 1 is a graph of the temperature and pressure profiles for the process of Example I.

DESCRIPTION OF THE PREFERRED EMBODIMENTS

Nitridation of silicon is a highly exothermic reaction. One problem with many of the prior art nitriding processes is that the reaction is not properly controlled which allows the exotherm to create a temperature above the melting point of silicon metal which results in closing off some of the interconnected pores between the silicon particles which in turn prevents one or both of full nitridation and high alpha content. To avoid this, the present process closely controls the nitridation so that the temperature of the silicon never reaches the melting point. This is accomplished by monitoring the furnace temperature and nitrogen pressure. The nitrogen flow is controlled with a fine metering valve and monitored with a massflow meter with an accuracy of within 5 scc/min. A pressure sensor switch accurate to within about 1.4 MPa is utilized to actuate a temperature controller and a solenoid valve controlling nitrogen input to the cold wall vacuum furnace in conjugation with a standard mechanical pressure/vacuum gauge.

The silicon metal powder useful in the present process is well known in the industry. Such powders are available in varying degrees of purity which are primarily based upon the iron content. Thus, the standard grades generally contain about 0.4–0.8%, while the pure grades generally contain less than 0.1%, and the superpure grades contain the iron only in parts per million. All of these grades are useful herein. The silicon powder used generally has an average particle size of less than about 20 microns, preferably less than about 10 microns, and most preferably about 3 microns or less, as the finer silicon particles have been found to result in silicon nitride powders having higher final surface areas.

The nitriding of silicon to form a $Si_3N_4$ having an alpha content in excess of 85%, preferably above 90%, is accomplished by the present process if some alpha silicon nitride seed, preferably an amount of about 5 to 40, most preferably about 10 to 30 weight percent is added to the silicon metal powder used to form the bed to be nitrided. Suitable seed material generally has a particle size of about 1 to 44 microns, preferably about 1 to about 10 microns. Still more preferably the seed will be present in an amount of about 15 to 25% of the bed being nitrided to simultaneously maximize the alpha content of the resultant $Si_3N_4$ and minimize the amount of silicon nitride that must be recycled.

In addition to the silicon metal and the silicon nitride seed, the formed bed may optionally contain conventional silicon nitride sintering aids, such as yttria, which will eventually be added to the $Si_3N_4$ to form sintered bodies therefrom. Also thermal diluents such as silicon carbide may also be present if the final product can contain such materials.

The silicon metal, seed, and any optional components are formed into a bed in a conventional manner except that the bed is generally substantially thicker than the beds used to produce RBSN when powder is the desired end product. The bed may either be uncompacted, i.e. have a density of about 0.5 g/cc, or compacted such as with a plate and manual pressure or by cold isostatic pressing to have a density of about 0.6 to 1.7, preferably about 0.7 to 1.5, and most preferably about 0.7 to 1.2 g/cc. The thickness and density of the bed are interrelated. Beds having a density of 1.5 g/cc should generally be up to about 1 cm thick, while beds having a density of 1.2 g/cc may be up to 3 cm thick and beds having a density of 1.0 g/cc may be 4 cm thick or more. As the density of the bed increases, its thickness should decrease. The use of compacted beds permits an increase in the load capacity of a given furnace while, in the present process, not proving detrimental to the efficient preparation of silicon nitride of high alpha content.

The bed is formed by pressing on conventional thick ceramic setter plates. Examples of suitable materials for the setter plates include alumina, reaction bonded silicon nitride, and silicon carbide.

The formed bed is placed into a cold wall vacuum furnace, such as is available from R. A. Brew & Co. of Concord, N.H., which has a leak rate which is less than about 10 microns per hour, preferably less than about 5 microns per hour. The reactor is equipped with a conventional gas inlet, pressure gauge, thermocouples, heating means, and cooling means. Preferably the gas inlet and the pressure gauge are located on opposite walls of the furnace to increase the accuracy of the pressure gauge reading and the uniformity of the $Si_3N_4$ powder produced.

The bed is then subjected to a high temperature deoxidation to remove the thin silicon oxide layer which is inherently present on silicon metal which is in contact with oxygen. This deoxidation is performed at a temperature of at least about 1150° C. for an extended period, generally at least about 2 hours. Preferably the deoxidation is performed at a vacuum of less than about 50 microns Hg, more preferably about 10 to 30 microns Hg. Alternatively, the deoxidation may be performed in a mixture of hydrogen and helium at 1300° C. It has been found that purer grades of silicon metal require longer deoxidation times, i.e. up to about 4 hours or more, to yield silicon nitrides of similar high alpha content. The essentially complete removal of the silicon oxide has been found to permit uniform low temperature nitridation which has been found to favor higher alpha phase $Si_3N_4$ formation. Preferably the deoxidation temperature is about 1200° C. or higher since lower temperatures do not result in sufficiently complete removal of the oxide, even if the time period is extended substantially beyond 4 hours, to permit the nitridation reaction to start at temperatures as low as 1150° C.

The temperature of the vacuum furnace is reduced to a temperature below which no nitridation occurs, e.g. about 1100° C., and the furnace backfilled to a preselected subatmospheric pressure, preferably a pressure of about 500 to 700 mm Hg, and most preferably about 550 mm Hg, with a gas mixture comprising about 30 to 85% nitrogen and about 70 to 15% of a high heat capacity gas combination of hydrogen and helium. Preferably the backfill gas mixture comprises 71% nitrogen, 4% hydrogen, and 25% helium. By incorporating high heat capacity gases into the backfill gas, they remain present throughout the nitridation reaction, improving the heat transport, and increasing the alpha content of the resultant $Si_3N_4$. With the preferred backfill gas composition at the preferred pressure about 160 mm Hg of high heat capacity inert gas is present.

Thereafter, the furnace temperature is increased to the initial reaction temperature which is preferably less than about 1250° C., more preferably about 1150 to 1180° C. One measure of the effectiveness of the deoxidation step is the temperature at which the nitridation reaction readily commences, since it has been found that if the oxide has not been essentially completely removed the reaction will not commence until a higher temperature is attained. If desired, the reaction may be commenced at temperatures higher than 1250° C., even up to about 1430° C. However, initial exposure to temperatures above about 1250° C. should only be for a limited time period or else a high alpha content silicon nitride will not be produced.

As the nitrogen present in the backfill gas composition reacts with the silicon, the pressure in the reactor drops. When the furnace pressure drops by some preset amount, i.e. about 5 to 50 mm Hg, nitrogen gas is fed into the furnace at an essentially constant rate while holding the temperature essentially constant. The rate is selected to provide nitridation at rates ranging generally from about 3 to 25% per hour, though higher rates may be used with certain bed configurations. The effect is a rate limited nitridation which provides extremely tight control of the process which increases the alpha content of the resultant $Si_3N_4$. The gas pressure is then allowed to decrease until the pressure drop caused by the nitridation reaction equilibrates with the additional fixed gas flow rate. As such, the nitrogen supply controls the extent of reaction which in turn prevents overheating of the silicon beds from the heat of reaction. The furnace pressure falls to that of essentially the high heat capacity non-reactive gases present, i.e. about 150 to 250 mm Hg. This results in an absolute reaction control mechanism which makes a high reaction rate and short cycle time possible.

As the reaction begins to slow, the gas pressure in the furnace increases due to the continuing nitrogen flow. When the pressure exceeds a pre-determined subatmospheric value, which generally is the same as the original backfill pressure, i.e. preferably about 500 to 700 mm Hg, and most preferably about 550 mm Hg, the nitrogen flow valve is closed, the temperature is allowed to ramp up, generally at a rate of about 20 to 100° C./hr, the reaction restarts, and when the pressure in the reactor again falls about 5 to 50 mm Hg the flow of nitrogen is restarted. The process continues in this cyclical manner until the reaction temperature reaches the desired endpoint of about 1400° C. The specific final temperature is a matter of design and unreacted silicon allowable in the final product. At this point the nitrogen flow is terminated and the now predominantly silicon nitride beds are soaked in nitrogen at the final temperature for an extended period, generally for at least about 2 hours to complete the nitridation. Preferred soak times have been found to be inversely proportional to the nitrogen flow rate used, i.e. when the nitrogen flow rate is such as to yield a 5% reaction rate a soak time of about 6 hours is preferred but when the reaction rate is 10% a soak time of about 4 hours is preferred. Since shorter soak times will result in shorter overall cycle times, the shortest possible soak should be used, as determined by routine experimentation. As such, the reaction is preferably conducted at the higher reaction rates to most efficiently produce high alpha content $Si_3N_4$.

After completion of the nitrogen soak, the vacuum furnace is cooled to room temperature. Preferably the cooling is performed in a controlled manner in the presence of nitrogen.

The resultant $Si_3N_4$ possesses a phase composition of at least 85% alpha-silicon nitride, less than 5% silicon oxynitride, less than about 0.5% silicon metal, and the balance betasilicon nitride. The silicon nitride contains less than 1% oxygen, preferably less than about 0.9% oxygen, and most preferably about 0.5 to 0.9% oxygen.

Thereafter the silicon nitride bed can be readily converted to a high alpha content powder by such as conventional crushing and milling operations. The powder generally has a BET surface area of about 4 to 9 $m^2$/gm. After milling to further reduce the particle size, a $Si_3N_4$ powder is produced having a BET surface area of about 10 to 12 $m^2$/gm and the stated phase composition. The process has been found to be reproducible with little or no variation due to bed location in the furnace.

Further preferred details of the process are included in the following non-limiting examples in which all parts and percents are by weight unless otherwise specified.

EXAMPLE I

Silicon metal powder having an average particle size of about 3 microns and containing 0.6% iron, 0.5% aluminum, and 0.05% calcium is dry blended with sufficient hammer milled (−100U.S. mesh) silicon nitride crude seed to form an 80-20% mix. The powder mixture is formed into beds 10"×10"×1.25" thick. It has a density of 0.5 g/cc. Eight beds are placed into a Brew 2 $ft^3$ high temperature cold-wall vacuum furnace designed for silicon nitridation. The furnace has molybdenum rod heating elements. The furnace is purged with a mechanical vacuum pump to achieve a 20 micron Hg vacuum. The furnace has a leak rate of less than about 5 microns per hour. Gas flow to the furnace is controlled using a fine metering valve and is monitored with a mass-flow meter accurate to within 5 scc/min. A pressure sensor switch accurate to within 1.4 MPa is used to actuate a temperature controller and a solenoid valve controlling gas introduction to the furnace. A standard mechanical pressure/vacuum gauge, on the opposite wall of the furnace to the gas inlet, is used along with the pressure sensor switch to monitor changes in system pressure. The furnace also has a water cooling recirculation system to accelerate cooling after completion of the nitridation reaction.

The furnace is then purged with a mechanical vacuum pump to achieve a vacuum of about 20 microns Hg and the temperature of the furnace is increased from room temperature to 1200° C. and held there for 2 hours to deoxidize the silicon metal powder. Then the temperature is ramped down to 1100° C. and the furnace is backfilled with a gas mixture of 71% nitrogen, 4% hydrogen, and 25% helium until the pressure reaches 550 mm Hg. The tank containing this gas mixture is removed and replaced by a tank of nitrogen. As the furnace temperature is increased to 1150° C., the nitridation reaction commences.

As the reaction continues, the pressure within the reactor begins to decrease as the nitrogen reacts with the silicon metal. When the pressure falls to 540 mm Hg and the internal furnace temperature has increased to about 1200° C., the temperature is then maintained constant and nitrogen gas is added to the furnace at a rate equivalent to a nitridation rate of 5%/hr and the rate limited reaction continues under rate limited conditions. When the reaction equilibrates at 1200° C., the gas pressure has fallen to about 175 mm Hg. Then the reaction continues at constant temperature and nitrogen flow rate until the reaction slows and the pressure increases until it reaches 550 mm Hg. Then the nitrogen flow valve is closed and the temperature allowed to ramp to 1350° C. using a ramp rate of 100° C./hr. And when the gas pressure again drops to 540 mm Hg the nitrogen flow is recommenced. When the reaction again equilibrates, the nitrogen flow is halted, the temperature ramped up to 1400° C., and the reaction continues with the further addition of nitrogen until the pressure again reaches 550 mm Hg.

FIG. 1 is a graphic representation of the temperature and pressure profiles described above. In the Figure, the solid line represents the pressure while the dashed line represents the temperature.

At this point, which is 28 hours after the reaction is started, the nitrogen flow is terminated and the predominantly alpha $Si_3N_4$ beds are soaked in nitrogen at 1400° C. for 6 hours. The furnace is then permitted to cool by starting the furnace's water cooling recirculation system. The total cycle time from cold-to-cold is 39 hours to produce 5 kilograms of product per cubic foot of furnace.

The resultant silicon nitride beds are removed from the furnace and the weight gain of each bed is found to be 61–62%. Each bed is crushed in a conventional hammer mill yielding a silicon nitride powder. Analysis of each of the eight powders showed alpha contents ranging between 92 and 95%, oxygen contents ranging between 0.6 and 0.9%, and free silicon contents ranging between about 0 and 0.3%.

EXAMPLE II

The procedure of Example I is repeated except that the silicon metal is replaced with a purer grade thereof containing 0.02% aluminum, 0.05% iron, and 0.02% calcium. The nitridation process is performed as in Example I but the nitridation reaction commences at a slightly higher temperature, i.e. 1180° C. and continues for 10 hours before the nitrogen soak. Thus the cold-to-cold cycle takes only 33 hours. The resultant silicon nitride beds exhibit alpha contents between 85 and 90% and oxygen contents between 0.8 and 0.95%. The slightly reduced alpha content is believed due to the higher purity silicon resulting in slower deoxidation kinetics of the surface oxide.

EXAMPLE III

The procedure of Example II is repeated except that the deoxidation period is extended to 4 hours. The nitridation begins at 1150' C. and continues for 16 hours, resulting in a total cold-to-cold process time of 36 hours. The resultant $Si_3N_4$ powders exhibit alpha contents averaging 94% while the oxygen content averages 0.8%.

EXAMPLE IV

The procedure of Example III is repeated except that the silicon metal beds are compacted to a density of 0.75 g/cc. The resultant $Si_3N_4$ powder exhibits an alpha content of 91–93% and an oxygen content of 0.85%.

EXAMPLE V

The procedure of Example I is repeated except that the nitrogen gas is fed into the reactor at a rate to maintain a reaction rate of 10%/hr, the nitrogen soak is for 4 hours. In addition, the initial reduced pressure is created in 2 hours, not 4, and the heat up for the deoxidation is performed in only 5 hours instead of 6. Thus the total cold-to-cold process takes only 26 hours and produces $Si_3N_4$ powder of the same quality as in Example I.

EXAMPLE VI

The procedure of Example II is repeated except that the amount of the alpha silicon nitride seed added to the silicon metal is increased to 30%. The resultant $Si_3N_4$ powder possesses an alpha content of 97%.

EXAMPLE VII

The procedure of Example V is repeated except that the nitrogen gas is fed into the reactor to maintain a reaction rate of 20%/hr and the nitrogen soak is reduced to 2 hours. Thus the total cold-to-cold process takes only 19 hours to produce the $Si_3N_4$ powder having an alpha content of 94%, an oxygen content of 0.65%, and a free silicon content of 0.2%.

EXAMPLE VIII

The procedure of Example I is repeated except that a super pure grade of silicon metal powder is used. The silicon powder contains only 70 ppm iron. No nitriding aids are used. The resulting $Si_3N_4$ beds exhibit alpha contents between 90 and 94%, oxygen contents between 0.4 and 0.6%, and free silicon less than 0.3%.

EXAMPLE IX

The procedure of Example I is repeated except that the silicon metal is replaced by a coarser silicon metal having an average particle size of 23 microns instead of 3 microns. The nitridation proceeds as in Example I resulting in $Si_3N_4$ powders having alpha contents averaging 88% and free silicon less than 0.2%.

EXAMPLE X

The procedure of Example I is repeated except that the backfill gas composition is 32% nitrogen, 4% hydrogen, and 64% helium. The resultant $Si_3N_4$ powders exhibit alpha contents between 89 and 94% and free silicon less than 0.1%.

COMPARATIVE EXAMPLE A

The procedure of Example I is repeated except that the furnace is backfilled with nitrogen in place of the gas mixture. A significant vacuum (<100 mm Hg) forms during the reaction and the alpha content of the resultant silicon nitride powder is found to be only 70%.

COMPARATIVE EXAMPLE B

The procedure of Example I is repeated except that the alpha silicon nitride seed is omitted from the bed formation. The resultant silicon nitride powder contains only 43% alpha phase.

COMPARATIVE EXAMPLE C

The basic procedure of Example I is repeated except that the nitridation reaction is performed at a positive pressure of 800 torr as in the Mangels article cited above. The resultant process does not exhibit the reproducible control of the present invention and the alpha content of the $Si_3N_4$ powder is only 30%.

COMPARATIVE EXAMPLE D

The procedure of Comparative Example C is repeated on a thin, i.e. less than 1 cm, compact (density 1.5 g/cc) of silicon metal to produce reaction bonded silicon nitride (RBSN). The resultant RBSN is found to be fully reacted and has an alpha content of 60%. This example shows that it is substantially easier to nitride thin compacts of silicon metal than the thick beds of the present invention.

EXAMPLE XI

The procedure of Example I is repeated except the deoxidation is performed at 1300° C. in a mixture of 4% $H_2$/He. The alpha content of the resultant powder is 95%.

EXAMPLE XII

The procedure of Example I is repeated except that the initial reaction temperature is 1370° C. When this temperature is maintained for 60 minutes and then reduced to 1250° C., the alpha content of the resultant silicon nitride is about 88%, but when the initial temperature is increased to 1430° C. for the same 60 minutes before reduction to 1250° C., the alpha content drops to 78%.

EXAMPLE XIII

The procedure of Example I is repeated except that the beds are compacted to a density of 1.5 g/cc and have a thickness of 1 cm. The resultant silicon nitride has an alpha content of 90%.

EXAMPLE XIV

The procedure of Example XIII is repeated except that the density of the beds is 1.2 g/cc and the thicknesses are 3 cm. The resultant silicon nitride has an alpha content of 88–94%.

What is claimed is:

1. A process for producing a silicon nitride having an alpha phase content of at least 85% which comprises the steps of (i) forming a bed of silicon metal powder containing at least about 5 weight percent alpha silicon nitride seed, (ii) placing the bed into a vacuum furnace, (iii) deoxidizing the bed at a temperature of at least 1150° C., (iv) reducing the temperature to below that at which nitridation occurs and backfilling the furnace to a subatmospheric pressure with a gas mixture comprising about 30 to 85% nitrogen and about 70 to 15% a combination of hydrogen and helium, (v) increasing the temperature to commence nitridation, (vi) allowing the pressure in the furnace to fall about 5 to 50 mm Hg before holding the temperature substantially constant, (vii) supplying nitrogen to the furnace at an essentially fixed flow rate of about 3 to 25% per hour based upon total theoretical nitrogen requirements for full conversion of the silicon to silicon nitride until the reaction rate is insufficient to utilize all of the continually added nitrogen and the pressure in the vacuum furnace reaches about the pressure of step (iv), (viii) terminating the addition of nitrogen and increasing the temperature about 50 to 150° C., (ix) repeating steps (vi)–(viii) until reaching a maximum temperature of about 1,400° C., (x) terminating the addition of nitrogen and allowing the bed to soak in nitrogen for at least about 2 hours, and (xi) cooling the reactor to room temperature.

2. The process of claim 1, wherein the deoxidizing is performed at a vacuum below about 50 microns Hg.

3. The process of claim 2, wherein the deoxidizing is performed at a vacuum of about 10 to 30 microns Hg.

4. The process of claim 1, wherein the deoxidizing is performed at a temperature of at least about 1200° C.

5. The process of claim 4, wherein the silicon metal powder contains about 0.5% iron and the deoxidizing is performed for at least about 2 hours.

6. The process of claim 4, wherein the silicon metal powder contains about 0.05% iron and the deoxidizing is performed for at least about 4 hours.

7. The process of claim 4, wherein the silicon metal powder contains less than about 100 ppm iron and the deoxidizing is performed for at least about 4 hours.

8. The process of claim 1, wherein the backfilling gas mixture consists essentially of 71% nitrogen, 4% hydrogen, and 25% helium.

9. The process of claim 1, wherein the furnace is backfilled to a pressure of about 500 to 700 mm Hg.

10. The process of claim 1, wherein the nitridation is commenced at a temperature of below about 1250° C.

11. The process of claim 1, wherein the nitridation is commenced at a temperature of about 1150 to 1180° C.

12. The process of claim 1, wherein the nitridation is commenced at a temperature above about 1250° C. and is then reduced to below 1250° C. before any substantial amount of betasilicon nitride is formed.

13. The process of claim 1, wherein the pressure is allowed to fall about 10 mm Hg before supplying additional nitrogen.

14. The process of claim 1, wherein the nitrogen is added at a rate equivalent to a nitridation rate of at least about 5% per hour.

15. The process of claim wherein the backfilling is performed at a temperature of about 1100° C. or less.

16. The process of claim 1, wherein the seed is used in an amount of about 5 to 40 weight percent of the silicon metal powder.

17. The process of claim 1, wherein the seed is used in an amount of about 10 to 30 weight percent of the silicon metal powder.

18. The process of claim 1, wherein the seed is used in an amount of about 15 to 25 weight percent of the silicon metal powder.

19. The process of claim 1, wherein the silicon metal has an average particle size less than about 25 microns.

20. The process of claim 1, wherein the silicon metal has an average particle size of about 3 microns or less.

21. The process of claim 1, wherein the bed of silicon metal powder is at least about 1" thick.

22. The process of claim 1, wherein the bed of silicon metal powder has a density of about 0.6 to 1.7 g/cc.

23. The process of claim 1, wherein the bed of silicon metal powder has a density of about 1.5 g/cc and is about 1 cm thick.

24. The process of claim 1, wherein the bed of silicon metal powder has a density of about 1.2 g/cc and is up to about 3 cm thick.

25. The process of claim 1, wherein the silicon nitride bed is converted into a silicon nitride powder.

26. The process of claim 25, wherein the silicon nitride bed is crushed to form the silicon nitride powder.

27. A process for producing a silicon nitride powder having an alpha phase content of at least 85% which comprises the steps of (i) forming a bed of silicon metal powder containing alpha silicon nitride seed, (ii) placing the bed into a vacuum furnace, (iii) deoxidizing the bed at a temperature of at least 1150° C. for at least about 2 hours, (iv) reducing the temperature to about 1100° C. or less and backfilling the furnace to a subatmospheric pressure with a gas mixture comprising about 30 to 85% nitrogen and about 70 to 15% a combination of hydrogen and helium, (v) increasing the temperature to commence nitridation, (vi) allowing the pressure in the furnace to fall about 5 to 50 mm Hg before holding the temperature substantially constant, (vii) supplying nitrogen to the furnace at an essentially fixed flow rate of about 3 to 25% per hour based upon total theoretical nitrogen requirements for full conversion of the silicon to silicon nitride until the reaction rate is insufficient to utilize all of the continually added nitrogen and the pressure in the vacuum furnace reaches to about the pressure of step (iv), (viii) terminating the addition of nitrogen and increasing the temperature about 50 to 150° C., (ix) repeating steps (vi)-(viii) until reaching a maximum temperature of about 1,400° C., (x) terminating the addition of nitrogen and allowing the bed to soak in nitrogen for at least about 2 hours, (xi) cooling the reactor to room temperature, and (xii) converting the resultant silicon nitride bed to silicon nitride powder.

* * * * *

UNITED STATES PATENT AND TRADEMARK OFFICE
CERTIFICATE OF CORRECTION

PATENT NO. : 4,970,057

DATED : November 13, 1990

INVENTOR(S) : Craig A. Willkens, Stephen D. Hartline, and Normand P. Arsenault

It is certified that error appears in the above-identified patent and that said Letters Patent is hereby corrected as shown below:

Column 1, line 25, after "OTHER PUBLICATIONS" insert
--EPO 0,186,497    July 2, 1986    Onoda Cement Co.--.

Column 11, line 34, after "claim" insert --1--.

Signed and Sealed this

Fourteenth Day of July, 1992

Attest:

DOUGLAS B. COMER

Attesting Officer

Acting Commissioner of Patents and Trademarks